US009368971B2

(12) United States Patent
Ellena et al.

(10) Patent No.: US 9,368,971 B2
(45) Date of Patent: Jun. 14, 2016

(54) MULTIPLE RENEWABLES SITE ELECTRICAL GENERATION AND REACTIVE POWER CONTROL

(75) Inventors: Gregory F. Ellena, Palm Beach Gardens, FL (US); Scott Thorp, Boynton Beach, FL (US); Kevin McWhorter, Palm Beach Shores, FL (US); George Quiroga, Boynton Beach, FL (US); Mark Mango, Jupiter, FL (US); Maximiliano Caceres, Tampa, FL (US)

(73) Assignee: Inventus Holdings, LLC, Juno Beach, FL (US)

( * ) Notice: Subject to any disclaimer, the term of this patent is extended or adjusted under 35 U.S.C. 154(b) by 888 days.

(21) Appl. No.: 13/532,367

(22) Filed: Jun. 25, 2012

(65) Prior Publication Data
US 2013/0162043 A1    Jun. 27, 2013

Related U.S. Application Data

(60) Provisional application No. 61/500,222, filed on Jun. 23, 2011.

(51) Int. Cl.
*H02J 1/10* (2006.01)
*H02J 3/38* (2006.01)
*H02J 4/00* (2006.01)

(52) U.S. Cl.
CPC ... *H02J 3/38* (2013.01); *H02J 4/00* (2013.01); *Y10T 307/50* (2015.04)

(58) Field of Classification Search
CPC .................................. H02J 3/38; Y10T 307/50
USPC ................. 307/52, 57, 55, 62, 67, 71, 76, 84; 290/40 A, 40 B, 44; 700/3, 287, 292, 700/304
See application file for complete search history.

(56) References Cited

U.S. PATENT DOCUMENTS

| 6,876,099 | B2 | 4/2005 | Wobben |
| 7,013,203 | B2 | 3/2006 | Moore et al. |
| 7,025,567 | B2 | 4/2006 | Wobben |
| 7,298,059 | B2 | 11/2007 | Delmerico et al. |

(Continued)

FOREIGN PATENT DOCUMENTS

| EP | 1512869 A1 | 3/2005 |
| EP | 1519040 | 3/2005 |

(Continued)

OTHER PUBLICATIONS

"Limiting Wind Output to Scheduled Value and Curtailing Schedules to Actual Wind Generation;" Bonneville Power Administration Transmission Services; Summary of DSO 216—Phase II; Oct. 13, 2009; pp. 1-3.

(Continued)

*Primary Examiner* — Carlos Amaya
(74) *Attorney, Agent, or Firm* — Feldman Gale, P.A.

(57) ABSTRACT

A method of configuring a renewable energy curtailment and control system uses a master controller and a plurality of controllers configured to control a cluster of renewable energy resources to deliver predetermined amounts of actual power and reactive power to a point of interconnect with a grid in accordance with contractual requirements with users of electrical power while reducing reactive power flow between renewable resources in the cluster.

5 Claims, 8 Drawing Sheets

(56) References Cited

U.S. PATENT DOCUMENTS

| | | | |
|---|---|---|---|
| 7,318,154 B2 | 1/2008 | Tehee, Jr. | |
| 7,372,173 B2 | 5/2008 | Lütze et al. | |
| 7,531,911 B2* | 5/2009 | Rivas et al. | 290/44 |
| 7,679,215 B2 | 3/2010 | Delmerico et al. | |
| 7,870,080 B2 | 1/2011 | Budike, Jr. | |
| 8,095,244 B2* | 1/2012 | Morjaria et al. | 700/287 |
| 2006/0132993 A1* | 6/2006 | Delmerico et al. | 361/20 |
| 2006/0132994 A1* | 6/2006 | Delmerico et al. | 361/20 |
| 2007/0001461 A1 | 1/2007 | Hopewell | |
| 2007/0013547 A1 | 1/2007 | Boaz | |
| 2007/0124025 A1* | 5/2007 | Schram et al. | 700/287 |
| 2008/0177678 A1 | 7/2008 | Di Martini et al. | |
| 2008/0195255 A1* | 8/2008 | Lutze et al. | 700/291 |
| 2009/0055030 A1* | 2/2009 | Mayor et al. | 700/287 |
| 2009/0192868 A1 | 7/2009 | Rajiv et al. | |
| 2009/0212563 A1 | 8/2009 | Morjaria | |
| 2009/0218818 A1* | 9/2009 | Cardinal et al. | 290/44 |
| 2010/0025994 A1 | 2/2010 | Cardinal | |
| 2010/0076613 A1* | 3/2010 | Imes | 700/287 |
| 2010/0094474 A1* | 4/2010 | Larsen et al. | 700/287 |
| 2010/0100253 A1 | 4/2010 | Fausak et al. | |
| 2010/0138066 A1 | 6/2010 | Kong | |
| 2010/0286835 A1* | 11/2010 | Nyborg et al. | 700/287 |
| 2010/0292856 A1 | 11/2010 | Fujita | |
| 2010/0292857 A1 | 11/2010 | Bose et al. | |
| 2011/0137474 A1* | 6/2011 | Larsen et al. | 700/287 |
| 2011/0153096 A1* | 6/2011 | Pal et al. | 700/287 |
| 2011/0187106 A1* | 8/2011 | Ichinose et al. | 290/44 |
| 2011/0224926 A1* | 9/2011 | Morjaria et al. | 702/60 |
| 2011/0298213 A1* | 12/2011 | Minami et al. | 290/44 |
| 2011/0301769 A1* | 12/2011 | Lovmand et al. | 700/287 |

FOREIGN PATENT DOCUMENTS

| | | |
|---|---|---|
| EP | 1672778 | 6/2006 |
| EP | 1672779 | 6/2006 |
| WO | WO 2006/132760 | 12/2006 |
| WO | WO 2010/096031 A3 | 8/2010 |

OTHER PUBLICATIONS

Robert A. F. Currie, et al.; "Actively Managing Wind Farm Power Outlet;" 2008; pp. 1-2.

M. Wolff, et al.; "Advanced Operating Control for Wind Farm Clusters;" 2006; pp. 1-5.

International Search Report in International Application No. PCT/US2012/044035, dated Oct. 25, 2012, European Patent Office, Netherlands.

* cited by examiner

MULTIPLE RENEWABLES SITE ELECTRICAL GENERATION AND REACTIVE POWER CONTROL

CROSS REFERENCE TO RELATED APPLICATIONS

This application claims the benefit of U.S. Provisional Application No. 61/500,222 filed Jun. 23, 2011, the disclosure of which is hereby incorporated herein by reference in its entirety.

BACKGROUND

The continuing development and improvement of renewable electrical generation facilities such as wind, solar, and energy storage, coupled with growing global emphasis on satisfying rising demands for electrical power using "green" facilities, has led to the increasing use of automated control systems to optimize active and reactive power control, and to maximize the efficient generation, transmission, and distribution of electrical power provided by renewable technologies. In addition, maintaining operational limits of generation, collection system, substation, and transmission equipment, and the ability to swiftly react to grid disturbances have become key initiatives to enforce grid reliability, thus further complementing the use of automated control.

For a variety of reasons, renewable sites tend to be constructed in "clusters," and are frequently located at distances geographically remote from the industrial and urban centers for which electrical power is required. In many cases the sites will incorporate different equipment manufacturers and different technologies, such as solar or wind electrical generation, or storage using batteries or other storage technologies. In addition, renewable sites are commonly restricted in various ways by Interconnect Agreements (IAs), which establish parameters for power being delivered to the grid at points of interconnect (POIs) between the clusters and the grid. IAs frequently control such parameters, also known as "set points," as voltage, active and reactive power, primary source (site), and transmission limits. Some IAs also include a schedule of different voltages to be delivered at different times, according to the schedule. Because "green" power generation tends to occur in rural areas, power is frequently delivered to multiple off-takers—municipalities and "green" companies—each of whom may have somewhat different requirements, and whose requirements must be incorporated into the delivered product.

As new "green" power generation facilities are built, they must be incorporated into IAs, which may place limiting requirements on them, and must be integrated with existing facilities without changing the set points established by the relevant IA for power being delivered to the POI with the grid. For instance, when a new wind site is being added to an existing wind farm, the AI may require that the primary source of power be the original (older) site, with the new site being secondary in terms of power being delivered to the POI, at least until the stability and reliability of the enlarged system has been established.

In conjunction with off-taker and transmission operator demands and requirements, manual regulation of power generation and reactive power (typically voltage control) produced at such sites can prove difficult.

Reactive Power Control

Renewable sites are commonly required to control voltage (as required by the relevant IA), and typically this is done via reactive power controllers. A reactive power controller enables each site to produce or consume reactive power, thus achieving the desired power factor, voltage, or reactive power setpoint at the requisite location such as the POI. However, when additional renewables sites are added to an existing system, an unstable condition may develop whereby the reactive power flows between the sites, rather than supporting the grid in concert as originally intended. Further consequences such as protective shutdowns or failure to reach the mandated setpoint can result if properly coordinated reactive power control of the multiple renewables sites is missing.

Generation Control (Curtailment, Frequency Response, etc.)

The transmission of electrical energy from generation sites to areas where it will be used is often limited by the capacity of the transmission lines, a phenomenon which is referred to as "congestion." Congestion occurs on electric transmission facilities when actual or scheduled flows of electricity across a line or piece of equipment are restricted below desired levels. These restrictions may be imposed either by the physical or electrical capacity of the line, or by operational restrictions created and enforced to protect the security and reliability of the grid. The term "transmission constraint" can refer to a piece of equipment that restricts power flows, to an operational limit imposed to protect reliability, or to a lack of adequate transmission capacity to deliver potential sources of generation without violating reliability requirements. Because power purchasers typically try to buy the least expensive energy available, when transmission constraints limit the amount of energy that can be delivered into the desired load center or exported from a generation-rich area, these constraints (and associated congestions) impose real economic costs upon energy consumers. In the instances where transmission constraints are so severe that they limit energy deliverability relative to consumers' electricity demand, such constraints can compromise grid reliability.

In cases in which more electricity is generated at renewables' sites than can be delivered using available transmission lines, it may be necessary to reduce electrical generation, an action otherwise known as "curtailment." Renewables curtailment typically occurs when there is excess electric production in an area and there is insufficient transmission capacity to move that electricity to demand centers. While other kinds of power plants typically reduce their output before renewables' plants do, given that the fuel costs and other operating costs of those plants are higher than those of a renewable plant, in some cases renewable plants may also be called on to reduce their output. Almost all renewable plants can curtail their output utilizing numerous methods, yet accomplishing the same goal.

There are other reasons why electrical generation may be curtailed, including the incidence of relatively high winds during times of minimum or low load, little to no cloud cover, and market factors such as relative costs of electricity. Factors related to the curtailment of wind power are identified and discussed in a report, Wind Energy curtailment Case Studies May 2008-May 2009, published by the United States National Renewable Energy Laboratory (NREL), NREL/SR-550-46716 (October 2009), the contents of which are hereby incorporated in their entirety.

So long as curtailment remains a primary means for regulating the delivery of electrical power to a power grid, inefficiencies will be inherent in the system. However, when curtailment is in effect amongst a group of renewable energy sites, or amongst two or more sites, inefficiencies may be reduced or minimized by appropriate balancing of the amount of active power being produced by each site or facility to maximize the efficiency and output of multiple sites while being curtailed.

Maximizing the efficiency and balancing the flow of reactive power during curtailment also needs to be addressed. Balancing is normally accomplished by using reactors—inductance devices—to consume reactive power (−VARs), and capacitors to create reactive power (+VARs). In addition, some wind turbine manufacturers are making internal circuitry available in the turbine unit that can apply capacitance or inductance when the turbine is not producing power. Since such circuitry is present and used during normal energy production to adjust the active and reactive power output, it can be made available within a local cluster of wind turbines, for example, to adjust power factor as necessary to achieve desired set points for the wind farm. Since the amount of reactive power varies with the total power being generated, the ability to make adjustments in this parameter without adding additional hardware may provide an overall benefit to the wind farm operator.

Alternating current (AC) electrical frequency is the number of cycles per second (Hz) with the United States standard for grid frequency being 60 Hz. Maintaining proper frequency is paramount for grid reliability and current trends indicate that the ability to react to frequency deviations—either negative or positive—will become customary in the near future for all renewables sites. A negative response entails the curtailment of power, which in turn, would pull the excessive frequency down to 60 Hz which is essentially is a hasty curtailment. On the other hand, experience has shown that a circumstance can arise whereby any number of neighboring renewable sites is curtailed and a nearly instantaneous injection of generation up to the total potential generation is necessitated for frequency support (positive—to increase grid frequency to 60 Hz). In this scenario, a rapid reaction (releasing curtailment) is vital, and is not feasible through manual curtailment intervention.

Another closely related problem with renewable sites occurs when voltage generated by wind turbines drops below nominal voltage for extended periods of time. Standard operational voltages range from between 90% to 110% of the nominal voltage being produced. Whenever the operational voltage drops below 90% of the standard operating range for a short period of time, it is considered a "low voltage excursion." This is a wind turbine issue that may affect an entire cluster. Under some circumstances, the low voltage may be sustained for longer than a short period of time. A Sustained Low Voltage Excursion occurs when the voltage is between 75% and 90% of nominal for a period of time of about 10 minutes, or 610 seconds. Low voltage excursions are costly, and can result is substantial revenue loss over time. Thus, a purpose of the invention is to eliminate such sustained low voltage excursions at wind sites by raising turbine voltage which can be done by increasing (producing) reactive power through reactive power controllers.

In the prior art, modifications to the output of individual turbines and wind farms were made manually, as conditions changed or as off-takers provided new or different parameters for the supply of power. One consequence of having to make changes manually was that set points were often established below desired levels in order to ensure that rapidly changing wind conditions would not increase power output above levels that were acceptable to off-takers before manual corrections could be applied. Attempts to resolve or improve the problem of making manual changes were made by substituting a programmable logic controller (PLC) to integrate real-time control logic to monitor the system and automatically make necessary adjustments when set points were changed or when output parameters changed as a result of increased winds or variances in the load. While using real-time logic control substantially improved response time for individual turbine units, the system of interconnected clusters experienced inefficiencies resulting from the fact that changes made in the output of single units affected overall system stability and caused unwanted side effects, such as the simultaneous creation of reactive power in one unit or farm and the consumption of that reactive power in another. Although power delivered to the POI was within off-taker set points, reactive power within the interconnected system would flow from one unit to another, and caused economic losses due to that inefficiency.

The realities of neighboring renewable sites and coordinating multiple site reactive power coordination, voltage schedules, long transmission lines, grid disturbances, frequency support, and balancing curtailment can prove difficult for manual regulation of power generation and reactive power. Therefore, this invention is directed to the automation of monitoring and control for reactive power and generation due to curtailment resulting from marketing or price balancing, transmission constraints and limits, imposed requirements such as those from off-takers, transmission operators and reliability coordinators, and most importantly grid reliability.

The invention also provides a means for master override control. By enabling multiple sites to communicate with one another to automatically control and monitor a single point of interconnect, the system operator can remotely control a site consisting of two or more individual sites to maximize efficiency and output while remaining in compliance with the various requirements such as voltage schedules or reactive power ranges. Additionally, appropriate balancing from multiple sources enables the operator to reduce response time for the marketing group, ISOs, and for the operator to curtail and release the renewables' sites, and provides continuous control and monitoring of multiple sites at a single point of interconnect. Finally, third parties such as off-takers can now directly control generation and reactive power on an as needed basis.

SUMMARY OF THE INVENTION

This invention is a method for controlling power delivered by a number of remotely situated "green" facilities using generation hardware from a variety of OEMs to a POI, to meet set points established by the Interconnect Agreement, and to increase efficiency between and among the generating facilities. The wind site curtailment control system is used to control the production to meet the Interconnect Agreement requirements of a single wind farm site or a multiple wind farm site with a single point of interconnect (POI). The wind site curtailment control system consists of a programmable logic controller (PLC) that acts as a common single point of interface to the wind farm management controller or wind farm SCADA system at each site regardless of the site's wind turbine manufacturer technology.

The PLC is programmed to prioritize the MW (megawatt) setpoints, market drive, central control override, or transmission limitation. The PLC then issues the resultant MW setpoint command to the wind site managing controller or SCADA system. In the case where there are multiple wind sites that have a single POI, a common POI MW setpoint is issued to one of the PLCs designated as the Master, and the network of PLCs are programmed with algorithms that incorporate the requirements of the multiple IAs to maximize production output and revenue for the site.

Because the sites may be remote from one another, voltage set points for each site may be required in order to cause the voltage at the POI and any secondary junctions to meet required set points at those interconnections. Voltage may vary with overall power production and with reactive power production or consumption, and the voltage differential between remote sites will not be constant, but will vary and must be monitored and adjusted as other parameters in the collection system vary. Typically, varying parameters are controlled using PLCs (proportional—integral—derivative controllers) which monitor an input and the rate of variance and provide an output that is related to the input and intended to reduce or eliminate the variance. However, in complex systems such as multiple wind sites that may include other "green" power providing facilities, the use of real-time logic to control specific parameters must be centrally coordinated in order to avoid the condition in which the individual controllers work against one another in attempting to bring stability to the parameter they are monitoring. The invention, therefore, measures all parameters both at the individual site and at a central monitoring area that is at the POI or, at least, downstream from the generating site that is nearest to the POI.

If curtailment is required, the invention provides method to achieve desired set points without creating instabilities or introducing inefficiencies. In the invention, multiple interconnected renewable sites are treated as a single renewable energy site for purposes of dealing with reactive power and active power. For example, whereas single turbines in the prior art had reaction controllers associated with each one whereby active and reactive power was adjusted to meet set points, the invention controls multiple sites by setting appropriate set points for each so that set points established by the IA are met at the POI. In addition, the invention reduces instability and reduces inefficiencies within the generating network by receiving and processing inputs from all sites at a single point and instructing controllers (PLCs) at each site to adjust the output of each site to produce the required power configuration at the POI.

In addition to collection of wind park output, the invention also accommodates methodology for incorporating other "green" power sources such as solar and integrated storage such as batteries. In all cases, a controller situated closest to the POI monitors power being delivered to the POI. Inputs include set points established by the off-taker as to voltage (which may follow a predetermined schedule), active power, and reactive power. Inputs may also include additional constraints such as a priority of primary and secondary sources, transmission line capabilities, and individual output parameters for each producing unit within the system. When power delivered to the POI is analyzed, corrections are determined by following an algorithm that identifies one or more parameters that are out of range, provides a corrective action based upon an analysis of current production by on-line units, and instructs the applicable unit to implement the corrective action. By continuously monitoring the entire integrated collection system and the collected output, the system provides maximum efficiency within the collection system while maintaining set points required by the off-taker.

DESCRIPTION OF THE PREFERRED EMBODIMENTS

Figure 1:
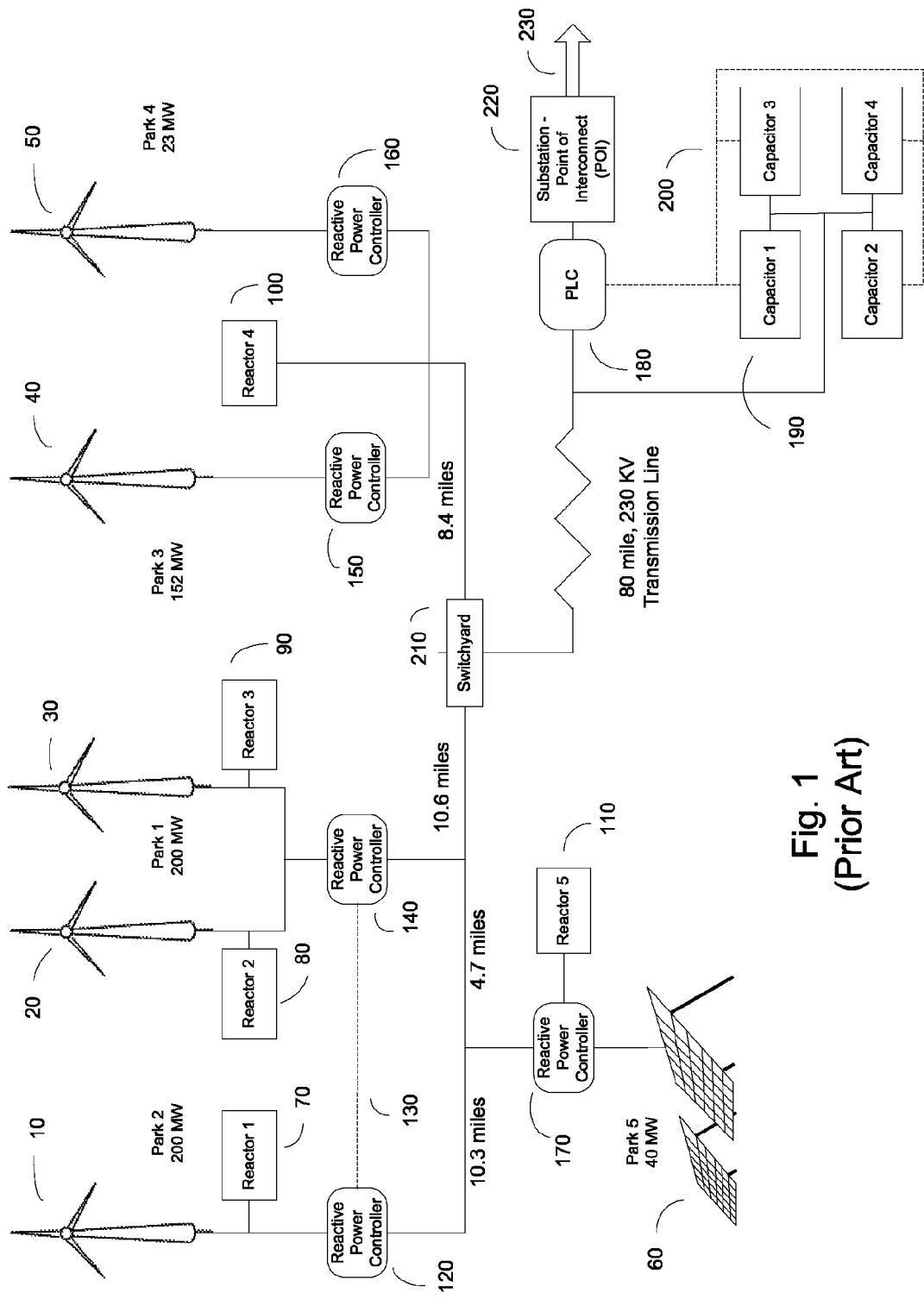
FIG. 1 is a schematic drawing depicting representative prior art configurations for clusters of renewable energy sources.

FIG. 1 is a depiction of a representative, hypothetical prior art renewable energy cluster. Four wind parks are shown as providing electric power from five groups of wind turbines, 10, 20, 30, 40 and 50, and a fifth park 60 is shown as producing solar energy. Each park has a reactive power controller 120, 140, 150, 160 and 170, that is programmed to maintain a setpoint voltage at all times that the resource is producing power. A number of reactors 70, 80, 90, 100 and 110 provide inductance, and are set to switch inductors on-line to consume reactive power whenever reactive power being produced by the monitored resource exceeds the set point for that reactor. In FIG. 1, the reactive power controllers and reactors form closed loops systems with their associated power generating resources. That is, reactor 170 monitors the MVARs being produced by wind turbine group 10 and adds inductance to consume reactive power as necessary to meet the predetermined set point for reactive power leaving Park 2. Similarly, reactive power controller 120 monitors the voltage produced by wind turbine group 10, and calls upon the wind turbines to increase or decrease voltage as necessary to meet the required, predetermined voltage set point. Voltage and reactive power are similarly regulated as closed loop systems for Parks 1, 3, 4 and 5.

A switchyard 210 is situated in the vicinity of the resources and provides a common connection point for the renewable sites and an 80 mile transmission line that delivers power to the point of interconnect (POI) 220 with the power grid. A PLC regulator 180 and a capacitor bank 190 are situated at the POI, and operate as a stand-alone closed system to regulate the amount of reactive power being delivered to the grid 230. If power delivered to the POI 220 should be less than −25 MVAR, one or more of the capacitors in capacitor bank 190 will be used to add MVAR to power delivered to the grid 230. A communication line 130 connects reactive power controllers 120 and 140, and provides a set point for reactive power controller 120 representing a constant voltage differential between Parks 1 and 2 to compensate for the voltage drop between those sites, and is intended to cause the voltages to be equal at Park 1. Typically, the response time for voltage controllers will fall in the range of 300 ms or so, and the response is intended to correct incipient problems before they have time to develop and cause even greater problems at a site.

The prior art configuration of FIG. 1 is typical for clusters of renewable power sources that have been created or developed at different times, and that are subsequently connected to provide power to a remote grid. Problems with clusters developed in this fashion include system inefficiencies related to constantly changing voltage and power factor set points which result from each controller's rapid response and modification of set points to change the output from each resource. Each such modification causes a variation in other parameters that are then subject to correction, in an ongoing spiral of changes in an attempt to attain system stability. In addition, the prior art configuration addresses voltage and power factor outputs at each park and at the POI to the grid, but because each corrective component is a closed loop system, nothing can be done to address or limit the flow of reactive power between sites amongst the interconnected resources. Finally, when a constant voltage differential is used to balance voltages between two adjacent sites, such as Parks 1 and 2, imbalances are likely to occur as power output is increased or decreased since the relevant voltages will vary as power output changes. In such circumstances, a constant voltage differential will not balance the sites, and further inefficiencies resulting from an imbalance in voltages will ensue.

Figure 2:
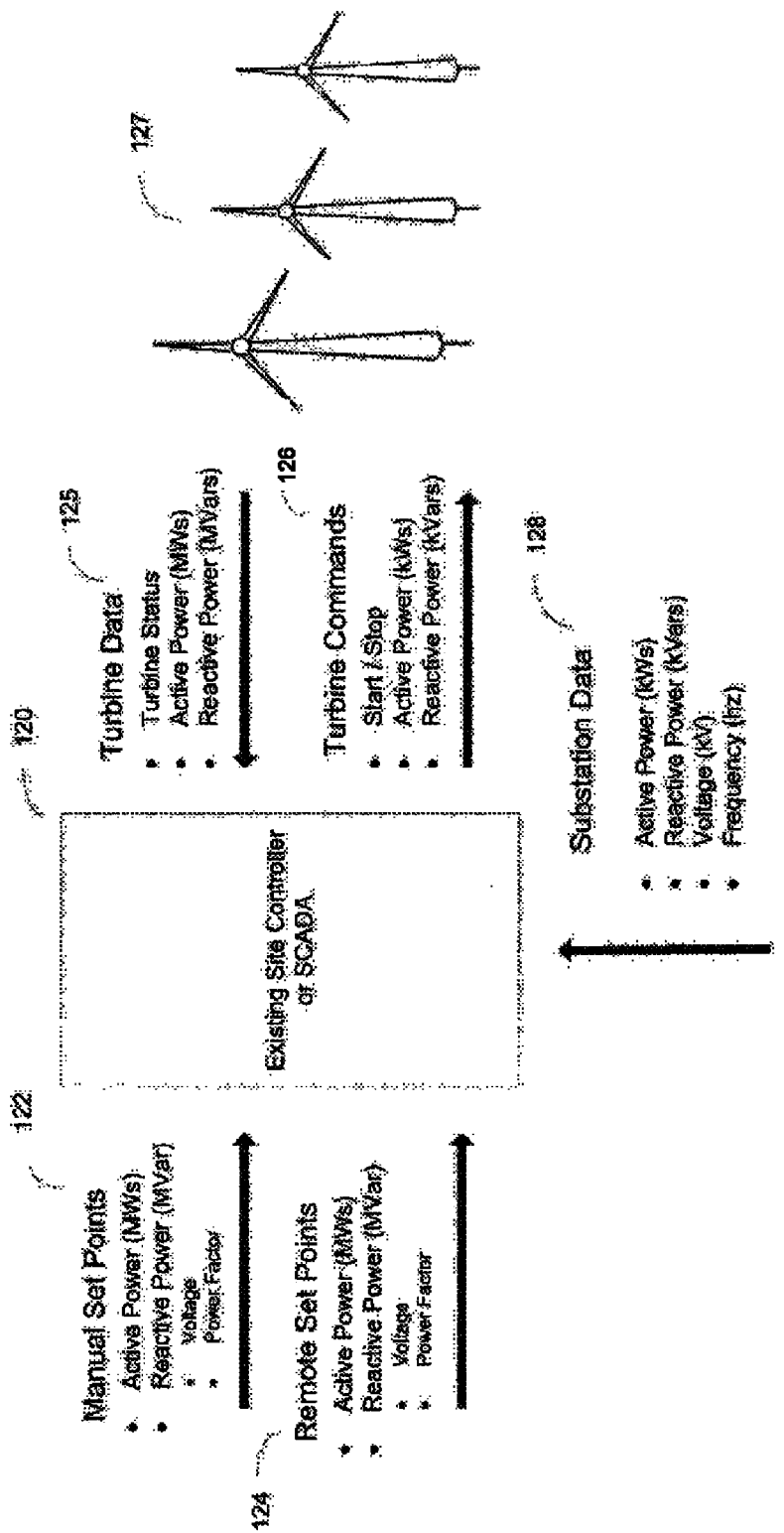
FIG. 2 shows a typical prior art site configuration for controlling active and reactive power for wind turbines.

FIG. 2 shows the detail of a prior art site wind turbine controller 120. Inputs to the controller include manual set points 122 for active power (MWs) and reactive power (MVars). Reactive power may require setting setpoints for either the voltage or the power factor for each site. Remote setpoints 124 are also provided to site controller 120, establishing required active power and reactive power to be delivered at a remote location, typically the POI. Turbine data 125 is also provided to the controller, and includes the status of each turbine at the site 127, and the active and reactive power being produced at the site in real time. Substation data 128 will include measurements of active and reactive power, voltage, and frequency at the substation or POI. Based upon this data, the site controller will provide commands 126 to control each turbine, giving start or stop commands and establishing the active and reactive power required from each turbine. As different manufacturers' turbines have different means for controlling active and reactive power and voltage, the site controller will be programmed to provide appropriate commands for each type of turbine.

It is apparent that manually providing set points for controller 120 requires the site operator to have knowledge of offtaker requirements at all times, and to manually make changes needed to cause the site to meet those requirements. When two or more sites are joined operationally, the problem of manually providing setpoints for each site becomes unwieldy and creates inefficiencies when two sites are each controlled in this fashion.

Figure 3:
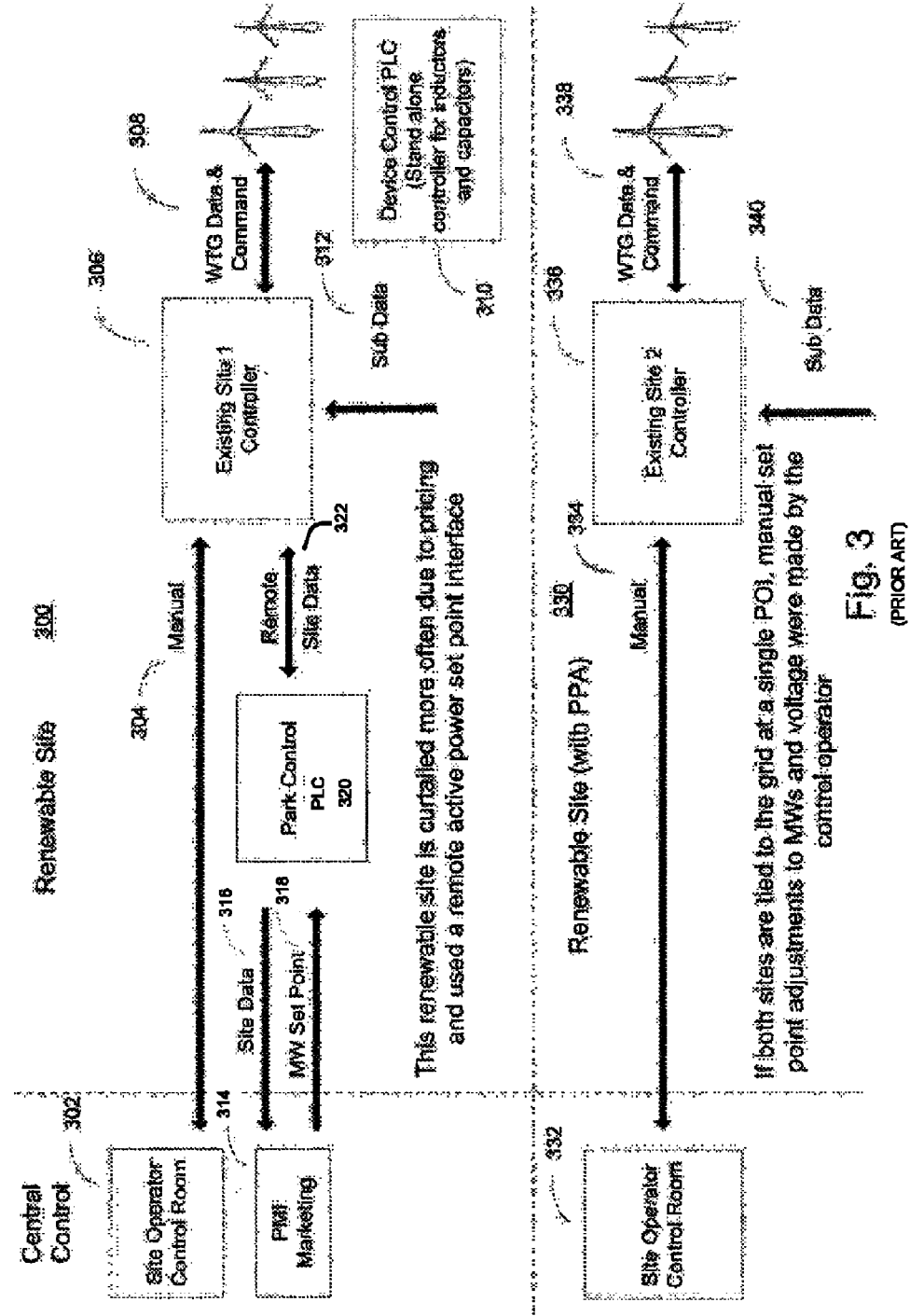
FIG. 3 depicts a typical site configuration in the prior art for controlling active and reactive power where curtailment is done due to pricing and manual setpoint adjustments are necessary.

FIG. 3 shows a schematic of two typical renewable sites, topmost one of which 300 produces power that is not dedicated to a single offtaker and therefore may be subject to frequent curtailment requirements, and the bottommost one of which 330 sells power to a single offtaker pursuant to a power purchase agreement (PPA). In FIG. 3, the site operator 302 provides manual setpoints 304 and monitors site performance to determine what adjustments may be required. Site controller 306 receives manual inputs 304 from the site operator, turbine information 308, and information from the substation 312 providing active and reactive power, voltage, and frequency. The marketing company 314 is monitoring data from the site 316 to determine production availability, and is selling power at competitive rates. As blocks of power are committed, the marketing company 314 provides MW setpoint information 318 to the PCL park controller 320. Park controller 320 receives data 322 from all power producers on the site and commands site 1 controller 306 to increase or decrease power production to meet the required marketing commitments. Site controller 306 operates as described for FIG. 2 to control wind turbines or other renewable resources at the site. As Park control PLC 320 requires more or less power over time, information regarding these adjustments are provided to the site control operator 302, who must make manual adjustments 304 to accommodate those requirements while keeping the active and reactive power within acceptable limits. In site 300, inductance and capacitance control 310 is a stand-alone controller that does not interact with site controller 306 but automatically increases or decreases inductance or capacitance to maintain active power and reactive power within preset limits. As inductance and capacitance are added or reduced in large banks of devices, controller 310 does not fine-tune the power output, but makes large adjustments to keep the power within larger limits, leaving fine-tuning to the site operator.

The lower half of FIG. 3 depicts information flow at a site 330 subject to a Power Purchase Agreement (PPA), in which all power produced at the site is sold to a single offtaker. The PPA requirements are known to the site operator 332, who receives information from the site controller 336 and manually adjust the power output as required. Site controller 336 receives inputs of substation data 340 and wind turbine data 338, and commands wind turbines as necessary to maintain power delivered within established setpoints.

Figure 4:
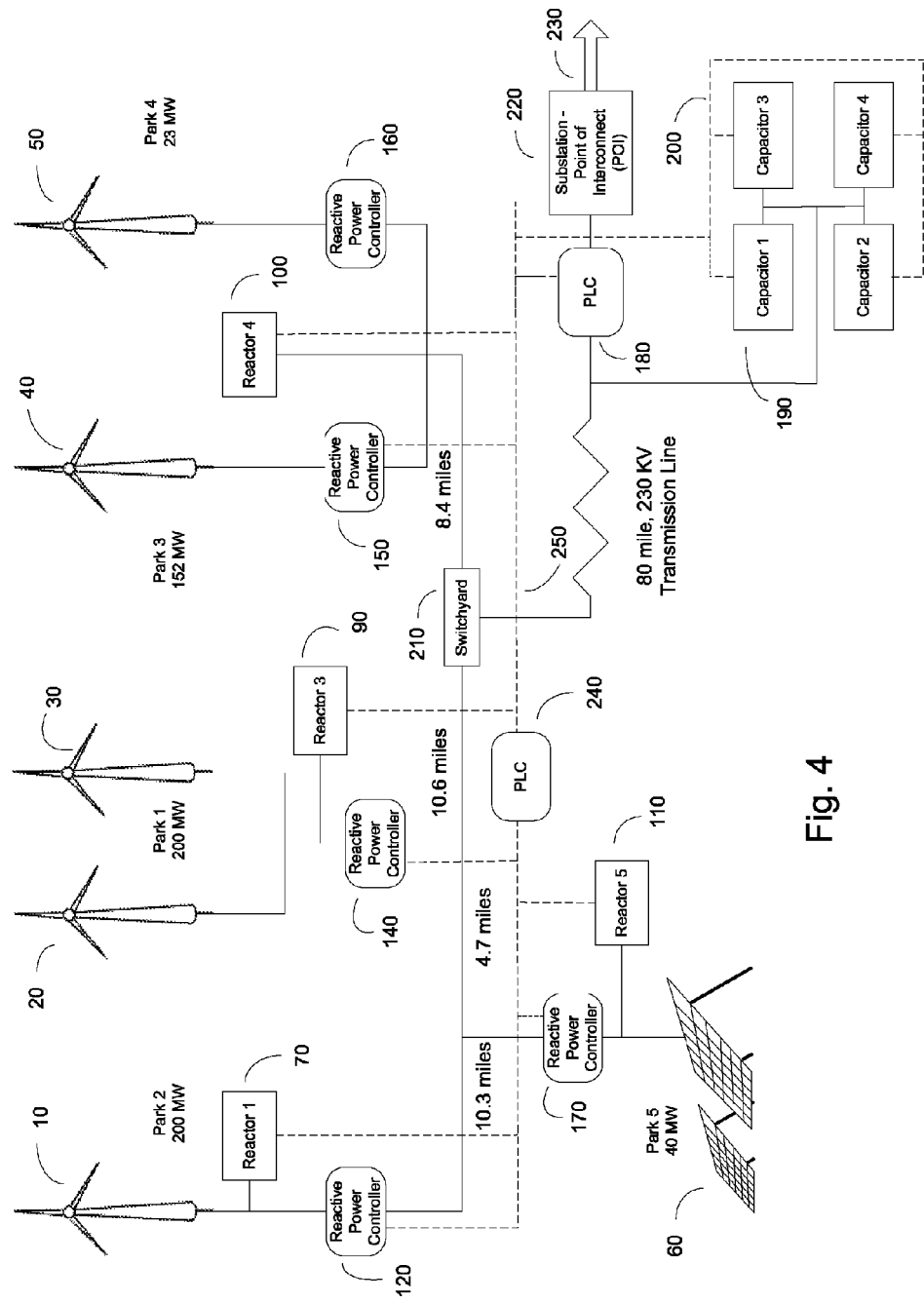
FIG. 4 is a schematic drawing depicting the representative renewable energy clusters of FIG. 1 reconfigured in accordance with the invention.

FIG. 4 is a schematic diagram representing the hypothetical renewable energy resources cluster of FIG. 1 reconfigured in accordance with the invention. In FIG. 4, communications links 250 have been established between master controller PLC 240 and each monitoring and activating component in the system. In adapting an existing site to use the control system of the invention, typically an existing site controller at or near the POI or the transmission line leading to the POI, may be designated as the master controller (the "brains") for the cluster, and all other controllers will remain operating as before. Thus, for example, site controller PLC 240 communicates with capacitor bank 190, voltage controllers 120, 140, 150, 160 and 170, and reactors 70, 90, 100, 110 and 180. In the configuration depicted in FIG. 4, Reactor 2 has been eliminated since the remaining reactor 90 for Park 1 30 is sufficient to consume MVARs generated at Park 1 when properly coordinated with the rest of the system. Processor 240 will receive information from a number of sources in addition to those enumerated above. Such input or preset information is discussed in part at FIG. 2.

Figure 5:
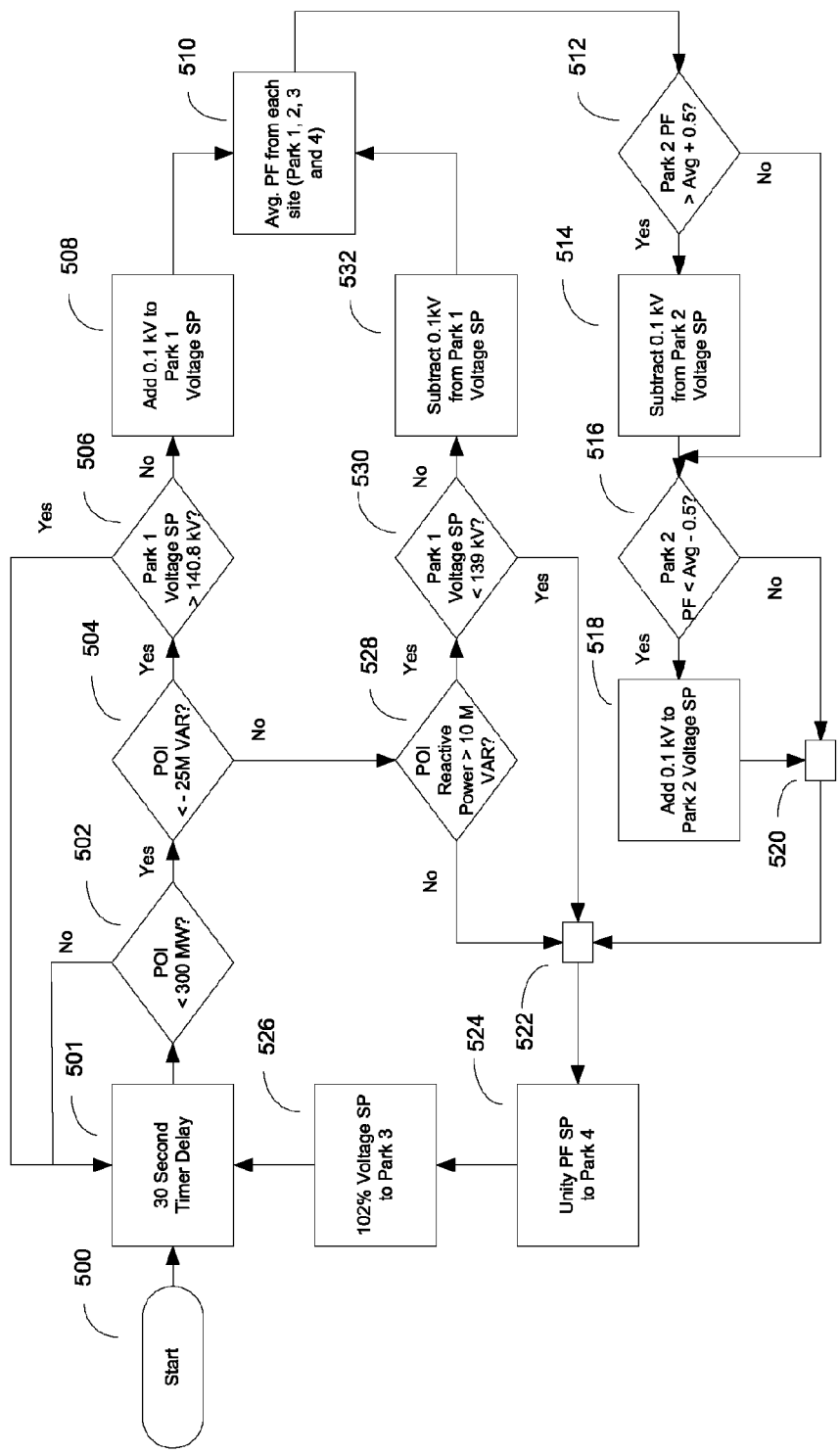
FIG. 5 is a flow chart depicting steps used in reconfiguring the renewable energy cluster of FIG. 1 in accordance with the invention.

FIG. 5 shows a flow chart for controlling a typical cluster in accordance with the invention. From the start point 500 in the diagram, a 30 second timer delay 501 is built into the control circuit to avoid having new corrective changes be commanded before the system has responded to earlier commands. At 502, a decision is made whether power (in megawatts) at the POI is greater than 300 MW. If it is not, the system is effectively shut down (or off line), and no changes will be made although monitoring of system will continue at 30 second intervals. At 504, reactive power (MVAR) is measured at the POI to ensure that it is within typical limits of >−25 and <+25 MVAR. If it is less than −25 MVAR, the reactive power is out of limits, and the flow chart moves to decision diamond 506. At 506, the controller checks to see whether voltage from Park 1 exceeds 140.8 kV. If the voltage exceeds 140.8 kV, the decision tree waits 30 seconds before taking the same path to see whether the situation has been alleviated. However, if the voltage is below 140.8 kV, then at 508 a command is issued to add 0.1 kV to the setpoint of Park 1. Thereafter, at 510 the average power factor from all parks is averaged and at 512 the power factor at Park 2 is compared to the resulting average plus 0.5. If the power factor at Park 2 exceeds the average of all parks plus 0.5, at 514 the voltage setpoint for Park 2 is reduced by 0.1 kV. At 516, if the power factor at Park 2 is less than the all-park average −0.5, then at 518 0.1 kV is added to the voltage setpoint for Park 2. At 524, a power factor of unity is sent to Park 4 as a setpoint, and a voltage setpoint of 103% nominal voltage is sent to Park 3 in order to maintain a predetermined voltage differential between Parks 3 and 4. Following another 30 second time delay interval, the process is started again. In the case at 504 that Vars at the POI should be greater than −25 MVar, the decision flow jumps to 528 to determine whether reactive power at the POI is less than +10 MVar. If reactive power is less than +10 MVar, then the system is within limits and no changes are made until the next 30 second time interval. However, if reactive power is greater than +10 MVar at 528, the decision path next determines, at 530, whether the voltage setpoint for Park 1 is lower than 139 kV. If the voltage setpoint for Park 1 is lower than 139 kV, the system sets the power factor and voltage setpoints for Parks 3 and 4, 524, 526, and waits for the next 30-second interval to run the process again. At 530, if it is determined that the voltage setpoint for Park 1 is greater than 139 kV, then at 532 the voltage setpoint for Park 1 is lowered by 0.1 kV, and the decision path returns to 510, where the average power factor for all parks is determined.

Figure 6:
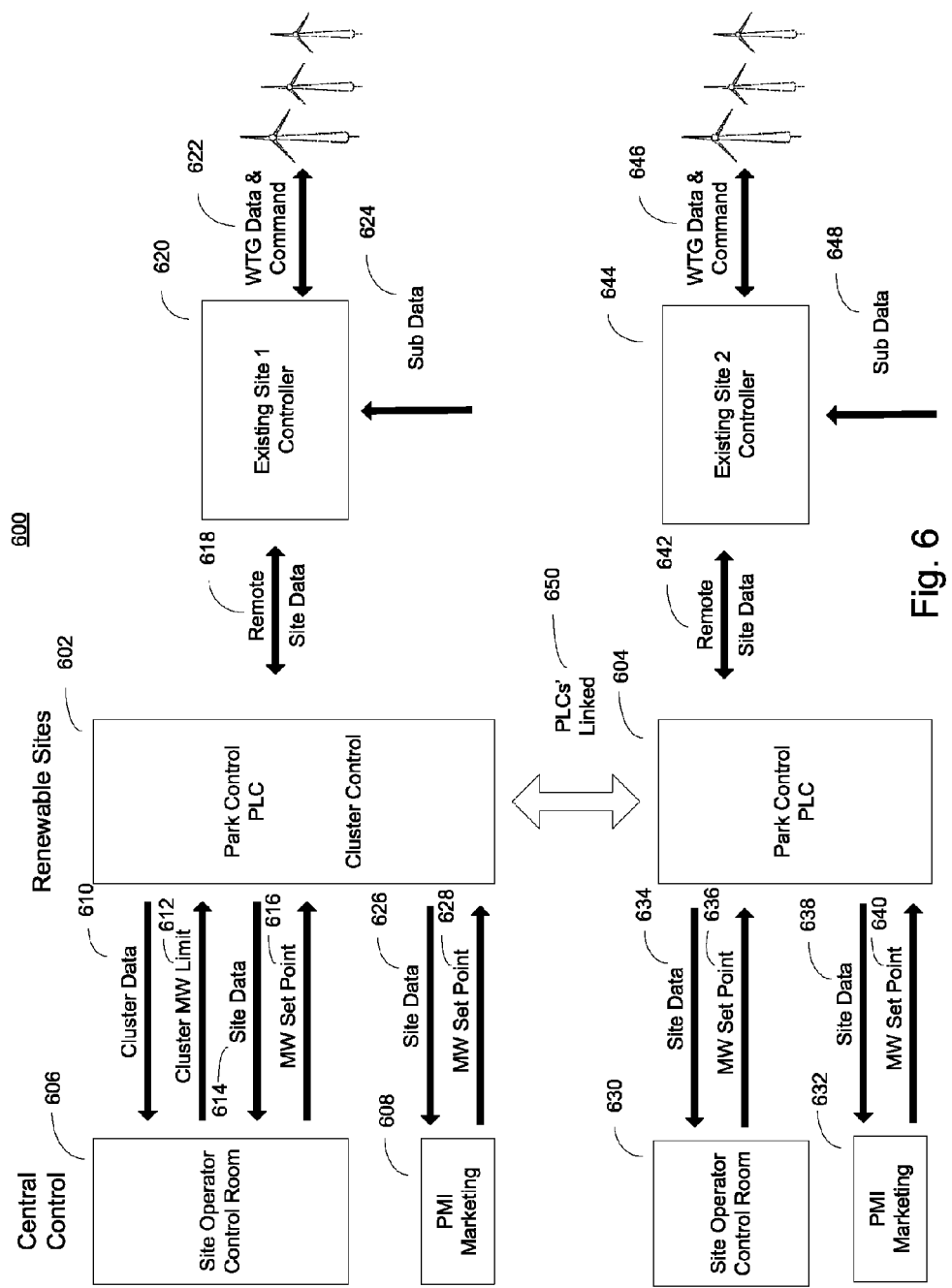
FIG. 6 schematically depicts the exchange of data between existing wind sites, PLC controllers for each site, and the cluster controller.

A more generic overview of the invention is depicted in FIG. 6. A cluster of renewable sites 600 includes existing controllers for a first site 620 and a second site 644. A park control PLC 602 has been selected as the master controller for the cluster, and receives information from the site operator 606, from a marketing company 608, from an existing controller 620 for site 1, and from park control PCL 604, which controls the park in which a second site 644 is located. Existing controllers for sites 1 and 2, 620 and 644, receive information from substations 624, 648 associated with their sites, and exchange data with wind turbine generators 622, 646, and with the controllers for each park, 618 and 642. Park controller 604 sends site data 634 to the site operator 630 and, in turn, receives a setpoint for MW 636 from the operator. In the case where power is not subject to a power purchase agreement (PPA), but is being actively marketed, power marketing company 632 will also receive site data 638, and will establish setpoints for MW 640. A link 650 between park controller 604 and master controller 602 provides communications whereby master controller 602 can receive information and provide commands to park controller 604.

In addition to sending site data 614, 626 and receiving MW setpoints 616, 628 from the site operator 606 or the marketing company 608, master controller 602 also sends cluster data 610 to and receives MW limits 612 from the site operator 606.

Figure 7:
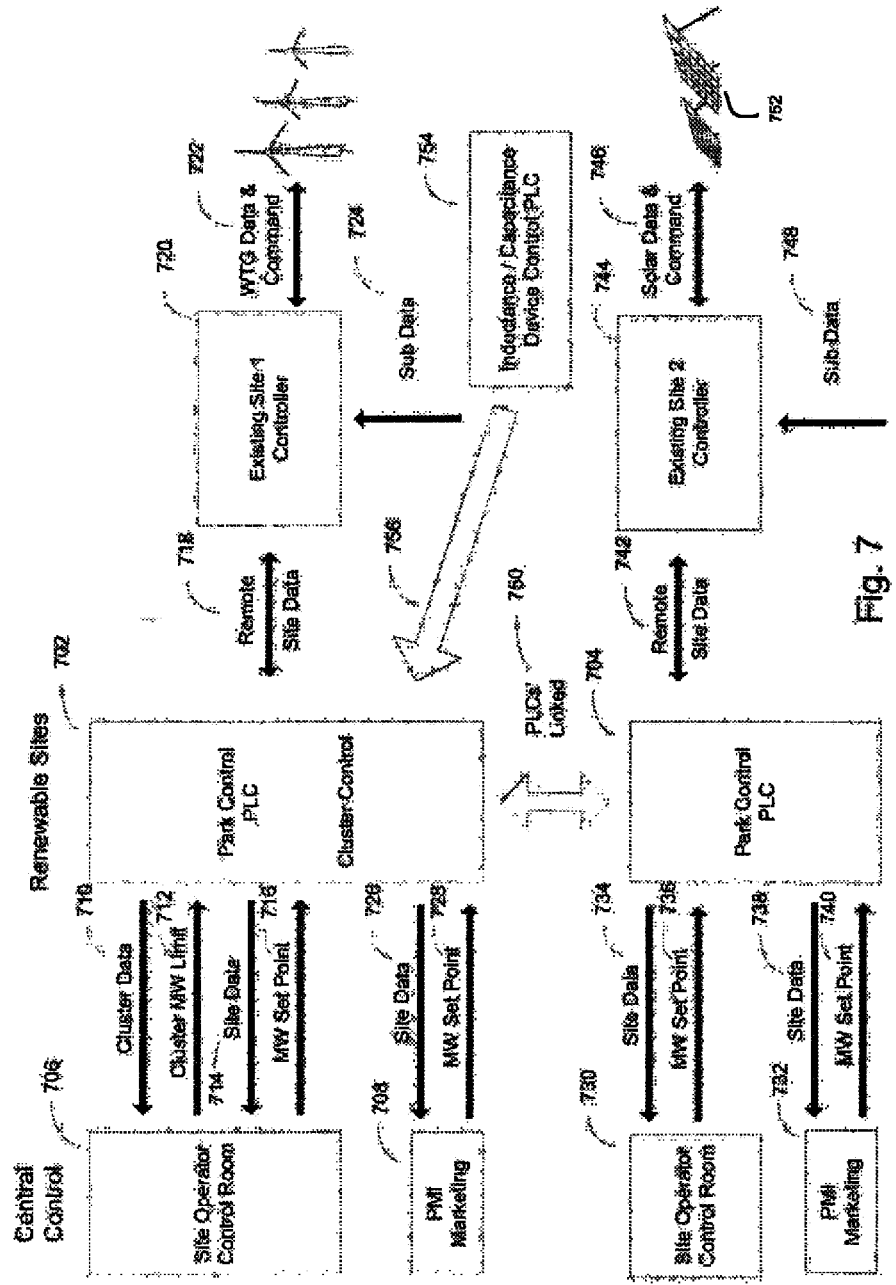
FIG. 7 depicts the integration of inductance and capacitance device control within the cluster controller of FIG. 6.

FIG. 7 shows a configuration similar to that shown in FIG. 6, but also includes a solar panel bank 752 that is linked to the site 2 controller 744, and that exchanges solar data and commands 746 with that controller. In FIG. 7, all reference numerals refer to the same components as are shown in FIG. 6, with the exception that the hundreds digit is a "7" rather than a "6." FIG. 7 also shows that control of inductance and capacitance devices 754 can be integrated with master controller 702 through link 756, thereby giving master controller 702 greater capacity to anticipate and control the production and consumption of Vars, rather than having to wait before measuring system responses to commands. As shown in FIG. 7, the invention is adaptable for use with all renewable energy resources, and is not limited to wind turbine technology or to products of any specific manufacturers.

Figure 8:
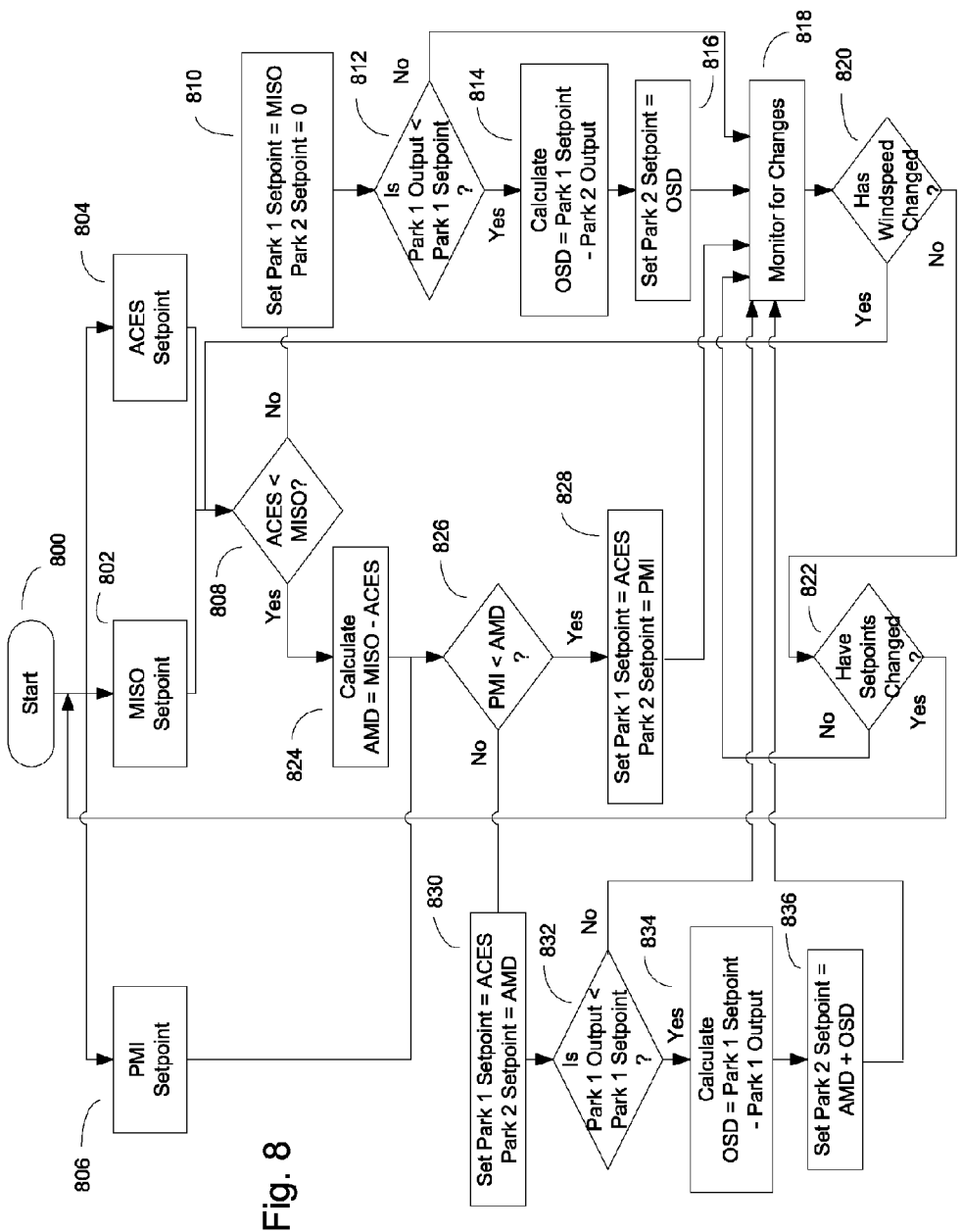
FIG. 8 shows a typical flow chart in accordance with the invention for a renewable site operating under a number of requirements provided by various offtakers.

FIG. 8 is a flow chart representing decisions for providing active power in accordance with setpoints provided by a number of relevant authorities. From the start 800 it may be seen that three power setpoints will be recognized and applied throughout the system. The renewable facility is a cluster formed from hypothetical wind sites Park 1 and Park 2. MISO 802 establishes one setpoint; ACES 804 applies a second; and the PMI marketing company 806 applies a third. At 808, the MISO and ACES setpoints are compared, and if ACES is higher, the decision tree moves to 810 where the setpoint for Story 1 is set to the MISO setpoint and the setpoint for Story 2 is set to 0. At 812, a comparison is made to determine whether the Story 1 output is lower than the Story 1 setpoint. If the output is lower, at 814 a calculation is made and OSD is set to the amount by which the Story one setpoint exceeds the Story 1 output. At 816, the Story 2 setpoint is set to equal OSD, thereby bringing the combined output of Story 1 and Story 2 up to the MISO setpoint. Thereafter, at 818, the system is monitored for changes. Windspeed is monitored at 820 and if it has not changed the decision tree moves to 822 to determine whether any setpoints have changed. If no setpoints have changed, the system moves back to 818 where the system will be monitored for changes. If, at 820, windspeed has changed, the decision tree goes back to 818, where the MISO and ACES setpoints are compared. If, at 822, setpoints have changed, the decision tree moves back to the start 800 to get the new setpoints from MISO 802, ACES 804, or PMI 806.

If, at 808, the ACES setpoint is lower than the MISO setpoint, the process moved to 824 where AMD is calculated as the difference between the MISO and ACES setpoints. At 826 it is determined whether the PMI setpoint is less than AMD (the difference between MISO and ACES). If the PMI setpoint is less than AMD, at 828 the Story 1 setpoint is set at the ACES setpoint and the Story 2 setpoint is set to the PMI setpoint. Then the decision tree returns to 818 to monitor for changes.

If, at 826, the PMI setpoint is greater than the AMD, then at 830 the Story 1 setpoint is set to the ACES setpoint, and the Story 2 setpoint is set to AMD. At 832, the Story 1 output is compared with the Story 1 setpoint. If the setpoint is higher than the Story 1 output, at 834 OSD is calculated as the difference between the Story 1 setpoint and the Story 1 output. Next, at 836, the Story 2 setpoint is set to be the sum of AMD and OSD. Thereafter, at 818, the system is monitored for changes.

Persons of skill in the art will understand that configurations other than those described here may be developed and installed in accordance with the invention. Such systems and configurations will fall within the scope of the invention, which is not limited by the embodiments disclosed herein, but only by the claims appended hereto.

We claim:

1. In a renewable energy system comprising a plurality of renewable energy resources distributed over a geographic area, a method of configuring a renewable energy curtailment and control system comprising the steps of:
   providing a master controller;
   providing a plurality of controllers configured such that each controller is at a discrete location remote from said master controller and is operative to controls one or more of said renewable energy resources;
   configuring said master controller and said plurality of controllers such that said master controller receives information from said plurality of controllers and issues commands to said plurality of controllers; wherein a communication link is established between said master controller and each of said plurality of controllers, thereby enabling said master controller to communicate with resources at each discrete location;
   providing said master controller with information comprising at least predetermined ranges of actual power and reactive power to be delivered to a point of interconnect remote from each said discrete locations;

processing said information and issuing commands to cause said renewable energy resources to provide power such that the aggregate of power from said renewable energy resources is delivered to said point of interconnect within said predetermined ranges of actual and reactive power.

2. The method of configuring a renewable energy curtailment and control system claimed in claim 1 wherein said information provided to said master controller includes curtailment information.

3. The method of configuring a renewable energy curtailment and control system claimed in claim 2, further comprising the steps of establishing and communicating set points for power and reactive power for at least wind turbine renewable energy resources.

4. The method of configuring a renewable energy curtailment and control system claimed in claim 3, further comprising the steps of monitoring active and reactive power at a plurality of points among said renewable energy resources, and issuing commands to said plurality of controllers to cause the flow of reactive power between resources to be reduced to a minimal amount while maintaining active and reactive power delivered to said point of interconnect within said predetermined ranges.

5. The method of configuring a renewable energy curtailment and control system claimed in claim 4, further comprising the step of monitoring voltages and setting voltage set points for at least some of said renewable energy resources.

\* \* \* \* \*